Nov. 21, 1933.   G. E. SHAFER   1,936,274
DIE
Filed Aug. 18, 1930   2 Sheets-Sheet 2
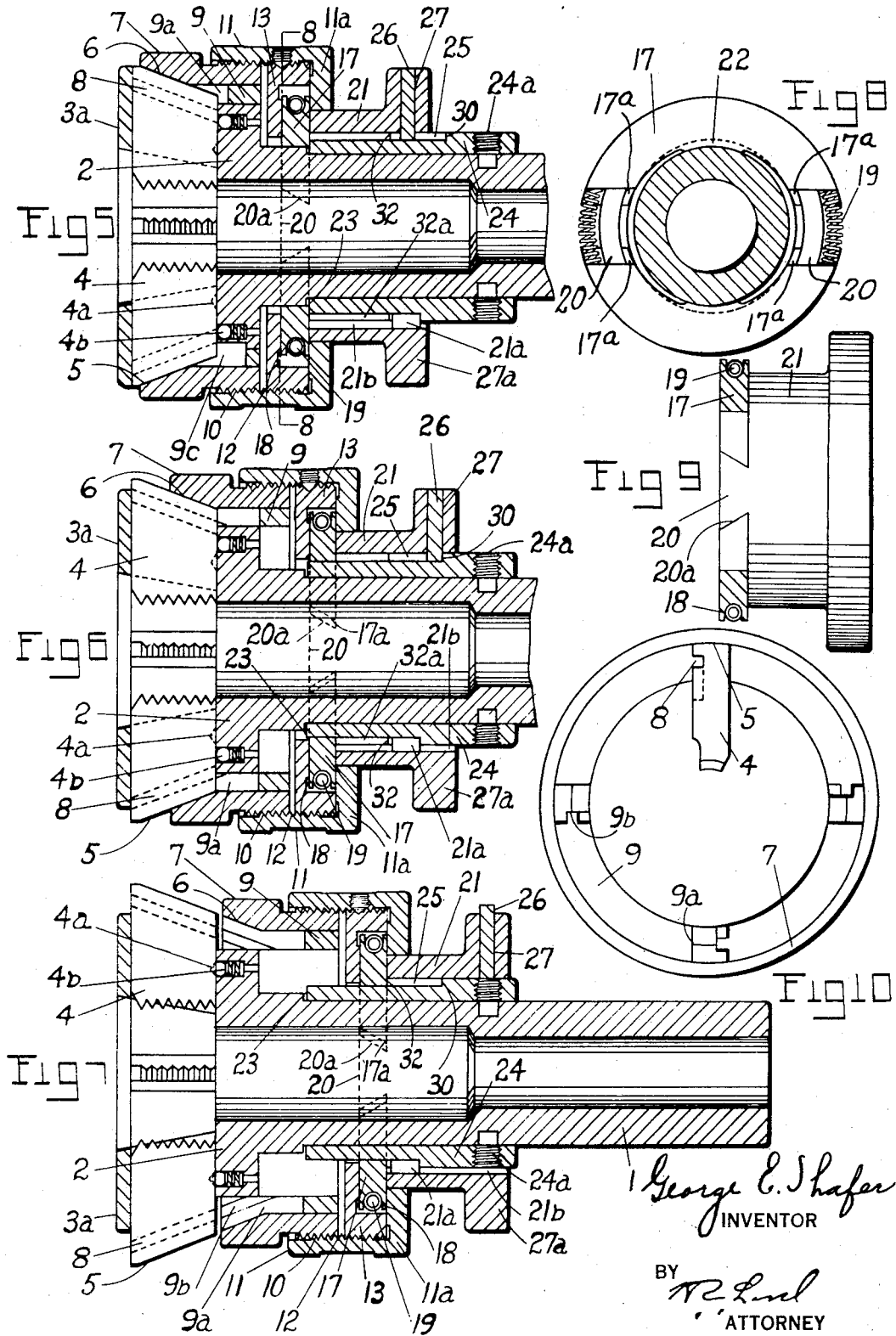

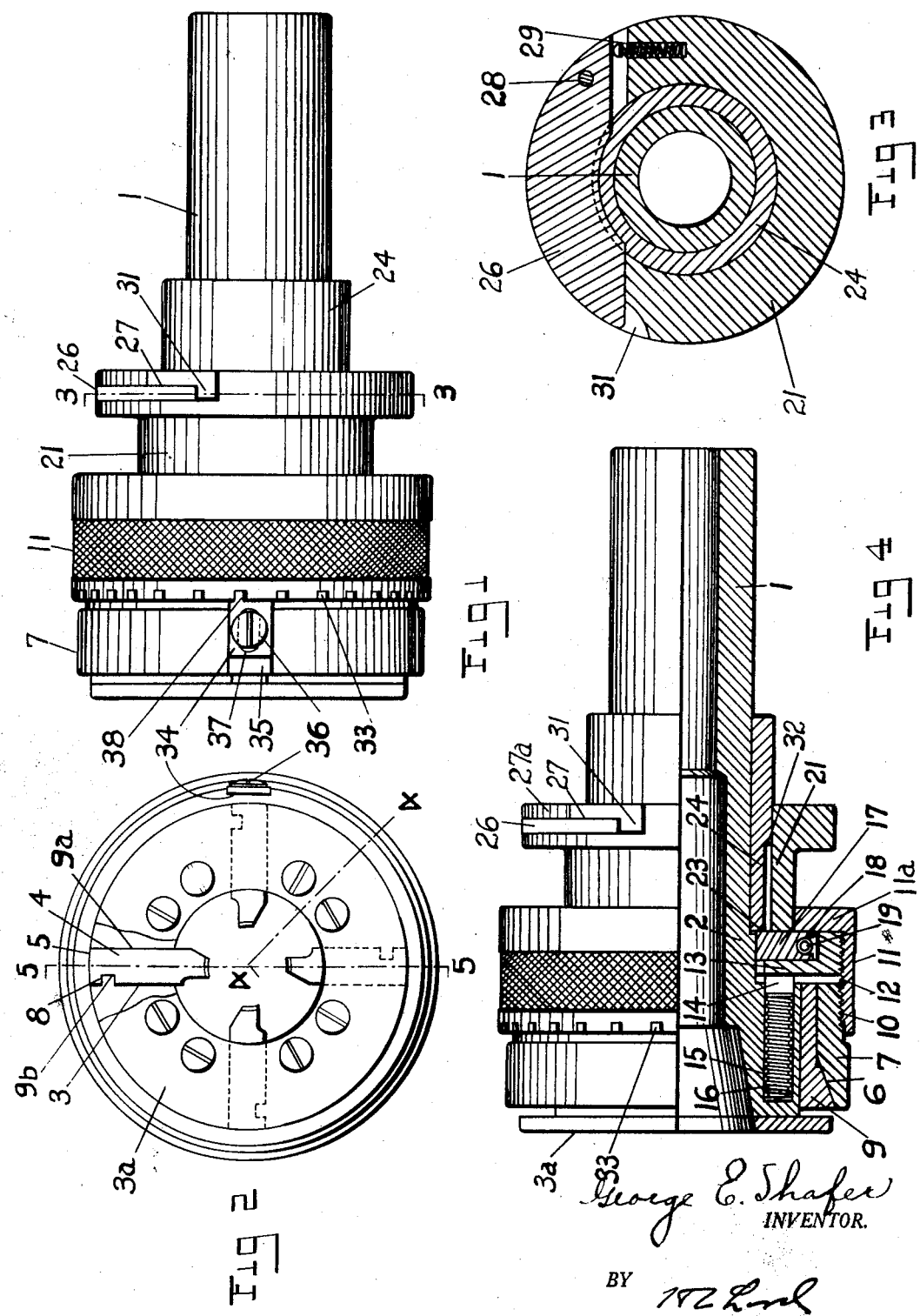

Patented Nov. 21, 1933

1,936,274

UNITED STATES PATENT OFFICE 1,936,274

DIE

George E. Shafer, Erie, Pa., assignor to Rickert-Shafer Company, Erie, Pa., a corporation of Pennsylvania Application August 18, 1930. Serial No. 476,203

6 Claims. (Cl. 10—95)

This invention is directed to that type of die which ordinarily automatically opens, or releases the chasers at a pre-determined point in the operation. Such dies commonly have a set position and with the present structure an improved form of lock is provided for locking the die in its set position. In connection with this improved lock there is also provided a second latch which positions the die in released position. The latches and locks are so arranged as to permit of a third position of the locking means so as to permit of the parts assuming a position permitting the removal of the chasers. The invention also contemplates the improvement of the cam means controlling the chasers and of the setting, or adjusting means for adjusting the cams operating on the chasers. Features and details of the invention will appear from the specification and claims.

A preferred embodiment of the invention is illustrated in the accompanying drawings as follows:—

Fig. 1 shows a side elevation of the die.

Fig. 2 an end view.

Fig. 3 a section on the line 3—3 in Fig. 1.

Fig. 4 is a side elevation, partly in section, on the line 4—4 in Fig. 2.

Fig. 5 a section on the line 5—5 in Fig. 2 with the die in set position.

Fig. 6 a similar view with the die in released position.

Fig. 7 a similar view with the die in position to permit the removal of the chasers.

Fig. 8 a section on the line 8—8 in Fig. 5.

Fig. 9 a view of the split locking ring and the actuator.

Fig. 10 an end view of the chaser releasing ring.

1 marks the shank of the die, and 2 the head. The head is provided with chaser receiving slots 3 which are closed by the usual end plate 3a. Chasers 4 are arranged in the slots 3 and these are provided with cam surfaces 5 at their ends. The cam surfaces 5 engage cam surfaces 6 on a cam ring 7 and act in such manner that the axial movement of the cam ring forces the chasers inwardly to set position. The chasers are provided with grooves 8. A releasing ring 9 is pressed into the cam ring 7. The front end of the ring 9 has slots 9a through which the chasers extend and tongues, or ribs 9b are arranged in the walls of the slots and extend into the grooves 8, the grooves being inclined to correspond to the inclination of the cams 6. This tongue and groove structure operates to withdraw the chasers as the cam ring and releasing ring are retracted.

The cam ring has screw threads 10 and an adjusting ring 11 is provided with screw threads 12 which engage the screw threads 10. The adjusting ring has screwed into it a plate forming an inturned flange 13 which is engaged by plungers 14. The plungers 14 extend into sockets 15 and are actuated by springs 16, the springs tending to force the adjusting ring and cam backward to release the die. A catch in the form of a split ring 17 is arranged in the adjusting ring 11. The split ring has an annular groove 18. A coil spring 19 extends around the split ring and is seated in the groove 18 tending to draw the members of the split ring inwardly into locking position. The ends of the split ring engage a cam projection 20 on an actuator ring 21. The circumferential edges of the projection 20 are provided with cam surfaces 20a and these engage the cam surfaces 17a on the ends of the segments of the split ring. The split segments have the inwardly extending shoulders 22 which when the split ring is closed engage a shoulder 23 formed by the end of a ring 24, the ring 24 being fixed on the shank by means of a screw 24a. The split ring is locked in position in the adjusting ring 11 by means of a flange 11a arranged at the rear of the split ring forming an internal annular groove in which the members of the split ring are locked axially but free to move radially.

The sleeve 24 has a flat portion, or cut-away portion 25 formed in it and a catch 26 extends into this cut-away portion. The catch 26 is mounted in a slot 27 in an actuating shoulder 27a at the rear of the actuator. This catch is pivotally mounted on a pin 28 and yieldingly forced into engagement with the surface 25 by a spring 29. A shoulder 30 is arranged at the outer end of the cut-away portion 25 and forms a stop engaging the catch 26.

As shown in Figs. 5 and 6 the catch in the set position is spaced from the shoulder 30, but when the split ring is released and the die moves rearwardly the cam ring and associated parts are stopped by the catch 26 as it engages the shoulder 30. This is the normal released position of the die. In order that the catch 26 may be readily operated the shoulder 27 has a notch 31 permitting the operator to take hold of the end of the catch and lift it so as to release the catch from the shoulder 30. When this happens the cam ring and the associated parts move farther back until the split ring 17 engages a shoulder 32 at the rear end of a cut-away portion 32a. The parts are shown in this position in Fig. 7 and at this position the chasers may be readily removed.

In order to yieldingly hold the chasers in position so that the tongues 9b will enter the slots 8 detents 4a are provided in the chasers which are engaged by spring-pressed pawls 4b. In order that the actuator may be locked against turning on the sleeve 24 a spline 21a is arranged in the sleeve 24 and operates in a groove 21b in the actuator. Likewise in order to lock the cam ring against turning relatively to the head a spline 9c is arranged between the ring and the head.

In order to readily lock the adjusting ring so as to adjust the depth to which the chasers are set the adjusting ring is provided with a number of teeth 33 around its periphery, preferably so spaced as to give a definite movement to the chasers such as a unit of one-thousandths of an inch, or a fraction thereof. A plate 34 is slidingly mounted in a groove 35 on the cam ring and a screw 36 extends through a slot 37 in the plate for clamping the plate in locked position. A projection, or tooth 38 extends into the space between adjacent teeth 33 when the plate is moved toward the adjusting ring so as to lock the adjusting ring firmly in an adjusted position. By loosening the screw and retracting the plate the adjusting ring is free to be turned to give the proper adjustment, and then by the replacement of the projection 38 between adjacent teeth 33 the ring is locked against turning, the plate being secured in this locked position by the screw 36.

In the ordinary operation of the die, the groove between the plate 11a and the shoulder 27 is utilized for actuating the die. As the screw advances relatively to the die the actuator is gradually retracted until the cam surfaces 20a operating on the cam surfaces 17a open the split ring. Immediately after the split ring is opened the springs 16 force the cam ring back to its released position, as shown in Fig. 6. In the ordinary operation of the device the work is then removed and the cam ring forced back to closed position by a return movement of the cam ring and as the split ring passes over the shoulder 23 it snaps in behind the shoulder, thus locking the cam ring in the set, or operating position. It will be noted that this split ring forms a catch having extended wearing surfaces so that it is well adapted to sustain the thrusts incident to holding the parts in their set position as the work is operated upon. The second catch forms a convenient means for stopping the device at the released position, utilizing the split ring for stopping the cam ring at a position permitting the removal of the chasers. Thus a rugged structure is provided and one in which the chasers may be quickly changed. The adjusting screw with its plate forms a convenient means for adjusting the depth of the cut by the chasers and the utilization of a separate ring for the cam ribs, or tongues for effecting the release movement of the chasers is desirable in that it simplifies the machining of the parts and permits of grinding the cam surfaces of the cam ring with great precision.

What I claim as new is:—

1. In a die, the combination of a head; chasers in the head; a cam ring acting on the chasers; a catch locking the cam ring in set position comprising a floating split ring, the ends of the ring having cam surfaces; an axially moving actuator having a cam projection extending between the split ring ends and operating to open the split ring with an axial movement of the actuator; and a shoulder against which the split ring seats.

2. In a die, the combination of a head; chasers in the head; a cam ring acting on the chasers; a catch locking the cam ring in set position comprising a floating split ring, the ends of the ring having cam surfaces; an axially moving actuator having a cam projection extending between the split ring ends and operating to open the split ring with an axial movement of the actuator; a shoulder against which the split ring seats; and a spring surrounding the split ring and tending to draw the split ring into locking engagement.

3. In a die, the combination of a head; chasers in the head; a cam ring acting on the chasers; a catch locking the cam ring in set position comprising a floating split ring; a shoulder carried with the head against which the split ring seats; an actuator opening the ring to release the die; a second catch stopping the cam ring at released position; and a second shoulder engaged by the split ring when the second catch is released.

4. In a die, the combination of a head; chasers in the head; a cam ring acting on the chasers; a catch locking the cam ring in set position comprising a floating split ring; a shoulder carried with the head against which the split ring seats; an actuator opening the ring to release the die; a second catch stopping the cam ring at released position; and a second shoulder engaged by the split ring when the second catch is released, the cam ring with the split ring in the last-mentioned position permitting the removal of the chasers.

5. In a die, the combination of a head; chasers in the head; a cam ring acting on the chasers; a first catch locking the cam ring in set position; an actuator operating on the first catch to release the same; a second catch on the actuator comprising a pivoted latch stopping the cam ring in released position; and a shoulder engaged by the first catch when the second catch is released for positioning the cam ring for removal of the chasers.

6. In a die, the combination of a head; chasers mounted in the head; a cam ring mounted on the head and actuating the chasers, said cam ring having an internal annular slot; a catch in the form of a split ring arranged in the annular slot, said split ring having cams at the ends of its members; a spring tending to close the split ring; an actuator having a cam projection extending between the ends of the split ring and adapted to open the same when moved axially; a shoulder connected with the head against which the split ring seats; a second shoulder connected with the head; a latch on the actuator operating on the second shoulder to stop the cam ring in released position; and a third shoulder carried with the head adapted to be engaged by the split ring when the latch is released.

G. E. SHAFER.